United States Patent [19]
Fulcher et al.

[11] 3,883,785
[45] May 13, 1975

[54] LOW SPEED PHASELOCK SPEED CONTROL SYSTEM

[75] Inventors: Robert W. Fulcher, College Park; John Sudey, Timonium, both of Md.

[73] Assignee: The United States of America as represented by the National Aeronautics and Space Administration Office of General Counsel-Code GP, Washington, D.C.

[22] Filed: Sept. 27, 1973

[21] Appl. No.: 401,466

[52] U.S. Cl. .................. 318/314; 318/318; 318/341
[51] Int. Cl. ............................................. H02p 5/00
[58] Field of Search .......... 318/138, 254, 314, 318, 318/341

[56] References Cited
UNITED STATES PATENTS

| | | | |
|---|---|---|---|
| 3,681,670 | 8/1972 | Kadokura | 318/318 |
| 3,753,067 | 8/1973 | Milligan | 318/314 |
| 3,764,888 | 10/1973 | Anderson | 318/318 |
| 3,783,359 | 1/1974 | Malkiel | 318/254 |

*Primary Examiner*—G. Z. Rubinson
*Attorney, Agent, or Firm*—R. F. Kempf; John R. Manning

[57] ABSTRACT

A motor speed control system for an electronically commutated brushless D.C. motor is provided which includes a phaselock loop with bi-directional torque control for locking the frequency output of a high density encoder, responsive to actual speed conditions, to a reference frequency signal, corresponding to the desired speed. The system includes a phase comparator, which produces an output in accordance with the difference in phase between the reference and encoder frequency signals, and an integrator-digital-to-analog converter unit, which converts the comparator output into an analog error signal voltage. Compensation circuitry, including a biasing means therein, is provided to convert the analog error signal voltage to a bi-directional error signal voltage which is utilized by an absolute value amplifier, rotational decoder, power amplifier-commutators, and an arrangement of commutation circuitry, forming an integral part of the phaselock loop and including position decoders, switches, and rotor position sensors, all cooperating to control the acceleration and deceleration of the motor to achieve symmetrical bi-directional torque control thereof. The phase comparator and integrator-digital-to-analog converter unit cooperate with a simplified overspeed control circuit to derive a signal which is utilized in the system to get the motor at its desired speed and to thereafter maintain it at that speed.

7 Claims, 8 Drawing Figures

LOW SPEED PHASELOCK SPEED CONTROL SYSTEM

ORIGIN OF THE INVENTION

The invention described herein was made by employees of the United States Government and may be manufactured and used by or for the Government for governmental purposes without the payment of any royalties thereon or therefore.

FIELD OF THE INVENTION

The invention relates to motor speed control systems and, more particularly, to a phaselock servo system for an electronically commutated brushless D.C. motor capable of operating at extremely low speed and having bi-directional torque control.

BACKGROUND OF THE INVENTION

There are, of course, a large number of different types of motor speed control systems presently in use which, in general, adequately serve the functions for which they are designed. However, conventional systems do, generally speaking, suffer certain disadvantages, particularly in specified areas such as compatability with low motor speed operation and ability to provide stable operation over extended speed ranges. Further, many of these systems are overly complex and thus excessively expensive to build and maintain as well as being incompatible with spacecraft applications. Moreover, systems comparable to that of the invention customarily require an external digital clock (in addition to a reference input) and are not compatible with conventional analog servo compensation. A further disadvantage of prior art systems is that they are generally only applicable to A.C. or brush-type D.C. motors, with such motors generally having the attendant disadvantages described below. Also, many of these systems do not provide bi-directional torque control. Further, although overspeed controls have been incorporated in such systems, in may instances, this has been done through the use of a rather complex design. It is also noted that typical prior art systems employ low pass filters to achieve conversion of a digital or pulse-width error signal into an analog error signal and this approach presents problems, particularly where employed to achieve wide servo bandwidth. For example, such an approach introduces excessive phase lag into the control loop and actually limits the gain and bandwidth which can be achieved. Finally, the characteristics provided by many prior art systems involve limit cycling, hunting, or excessive jitter, all of which limit precise low speed operation and hence suffer obvious attendant disadvantages.

SUMMARY OF THE INVENTION

In accordance with the invention, a motor speed control system is provided which either overcomes or substantially reduces the effects of the disadvantages of the prior art. For example, the system of the invention is self-locking and provides both adjustable gain and adjustable D.C. bias. Considering these latter two features more specifically, the invention provides for selection of the relationship between the changes in the input of the pulse duration times and changes in the output analog error voltage and also for setting of the output level of an integrator-digital-to-analog converter unit to vary about any desired D.C. level. This latter feature, which is important because mechanical motor loads can often be separated into fixed and variable components, permits the phase locked loop described herein below to operate at any desired percentage of pulse width. In addition, the output signal is compatible with conventional analog servo compensation, and the converting techniques used is compatible with low speed direct drive torquer operation, such as 3 rpm with a 16,384 cycles per revolution encoder. In this regard, the system enables stable operation over a speed range of about 2 to 100 rpm and provides both high gain and wide bandwidth servo operation at low speeds. All this judiciously tailored with bi-directional poweramplifier commutation to remove positive as well as negative torque disturbances.

Further, the use of an electronically commutated brushless D.C. motor with the speed control system provides a number of advantages as compared with systems which use A.C. motors (e.g., reduced weight and power) and brush-type D.C. motors (e.g., advantages such as no brush problems, low RFI/EMI characteristics and compatibility with spacecraft environments). In addition, the system incorporates overspeed control in a highly simplified manner, and, as will become more apparent, provides a smooth transition from an out-of-lock condition to the phaselock mode. Other advantages include the elimination of the effect of motor electrical time constant by viewing the motor as a torque transducer and, as a consequence, controlling motor speed by controlling current to the motor windings in contrast to applied voltage. Further, the elimination of low pass filters, in converting the pulse width error signal into a corresponding analog signal, provides significant improvement in system responsiveness and stability and is particularly important in applications such as in driving a tape recorder because of decreased flutter. The system of the invention produces an error signal which corresponds exactly to the continuous waveform at the sampling instant. In addition, the pulse width frequency (carrier) is removed and, as stated, only small discontinuities between one amplitude and the next remain, thereby resulting in a relatively smooth torque characteristic and low jitter.

Considering the invention itself in more detail, a motor control system for a brushless, electronically commutated D.C. motor is provided which employs phaselock techniques to provide extremely accurate speed control. In accordance with a presently preferred embodiment, the motor speed control system comprises a reference frequency oscillator for generating a signal having a frequency proportional to the desired speed of the brushless D.C. motor; a high density encoder responsive to actual motor speed for generating an output having a frequency proportional to that speed; a phase comparator for comparing the frequency of the reference frequency oscillator output with that of the encoder output and generating a pulse output in accordance therewith; an integrator-digital-to-analog converter unit for converting the phase comparator output into an analog error signal voltage; a compensation network for converting the analog error signal to a bi-directional error signal which is combined with the output of a simplified overspeed control circuit so that the system achieves both phaselock and overspeed control; and means for utilizing the bi-directional error signal to control the acceleration and deceleration of the motor to obtain the symmetrical bidirectional control thereof necessary to get and maintain the motor at its desired speed through the motor winding selection and signals fed thereto. The latter named means includes a absolute value amplifier for deriving rectified error signals and, with the cooperation of a rotation decoder, a polarity detection signal; and power amplifier commutators interconnected with the commutation means of the motor such that commutation means is an integral part of the phaselock loop.

Other features and advantags of the invention will be set forth in or be apparent from the detailed description of a presently preferred embodiment found hereinbelow.

DESCRIPTION OF A PREFERRED EMBODIMENT

Figure 1:
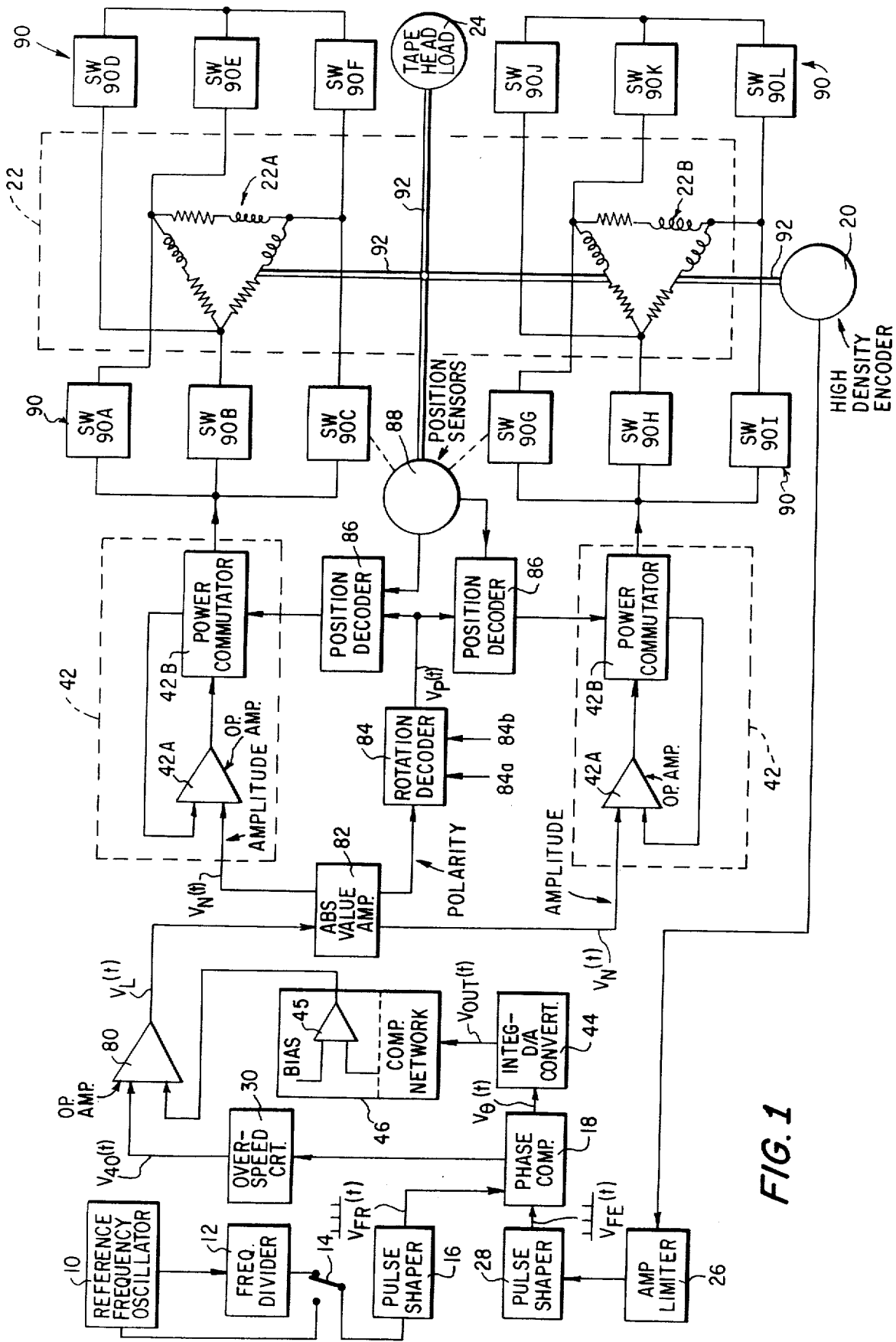
FIG. 1 is a block diagram of a motor speed control system according to a presently preferred embodiment of the invention.

Referring to FIG. 1, there is shown a block diagram of the inventive motor speed control system adaptable to a tape recorder or more specifically to a helical tape recorder. Although the invention is described relative to driving a tape recorder, it will of course be understood that it has wider applicability, particularly with motor driven systems where precise control thereof is desired. The system includes a reference frequency oscillator 10 which is considered to be external to the control system proper, and the reference frequency provided thereby can be derived, in an exemplary embodiment, from the time reference provided in the spacecraft in which the system is incorporated. The reference frequency oscillator 10 governs the long term speed stability of the control system since, as explained hereinbelow, the control system locks the frequency of the signal of high density encoder 20 to that of the reference output provided by oscillator 10. The reference frequency chosen is a function of the speed (in revolutions per second) desired and the encoder density (in lines per revolution), and an exemplary frequency of 14,760 Hz may be used in the specific embodiment under consideration. Further, a square wave of approximately 5 volts zero-to-peak is desirable for the specific application under consideration.

The output of reference oscillator 10 is connected to a frequency divider 12 which is considered an integral part of the control system. The divider 12 includes logic circuits for dividing the 14,760 Hz reference frequency by a factor of 18. A switch 14 permits selection of the 14,760 Hz of oscillator 10 for playback or the 820 Hz frequency of divider 12 for recording. The output of switch 14 is connected to a first pulse shaper 16 which can be a conventional monostable multivibrator, the output of pulse shaper 16 forming one input to a phase comparator 18 described hereinbelow.

The second input to phase comparator 18 is derived from high desity encoder 20. The encoder 20, as indicated in FIG. 1, is part of an integral assembly which also includes D.C. motor 22, indicated in dashed lines, and a tape/head load 24. In an exemplary embodiment, the encoder 20 takes the form of a conventional photo optical encoder or "inductosyn" and produces 16,384 cycles per revolution to establish a servo reference of 820 Hz and 14,760 Hz, respectively, for 3 rpm and 54 rpm operation of motor 22.

The accuracy of encoder 20 is extremely important in that the total system performance only be as good as the encoder itself. A number of problems are encountered in providing this accuracy such as line resolution and detection limitations. Best results are achieved by using a high density encoder (anyone of the high desity precision designs being suitable) which minimizes both phase shift in the forward loop (an acute problem at the 820 Hz reference frequency) and the effects of disturbing torques. As presently used, however, it must have at least 16,384 counts per revolution in order to be compatible with stable, relatively high bandwidth servo operation as low as 2 rpm. With the use of higher desity encoders, the control system will pass more encoder error haromics which give rise to higher speed jitter. In particular application for which the invention is used, this can be tolerated. For other applications it may be desirable that the phase comparator 18 (discussed in detail hereinafter) be modified so as to code the output thereof into yet another (set-clear) binary or trilevel sequence with appropriate filtering being used to recover the error signal. Further, the encoder could include parallel readout stations which would be used one at a time, the other station being automatically switched in if the first falls.

The output of encoder 20, generally a sine wave signal having an amplitude of about 4 volts peak-to-peak with inherent amplitude modulation caused by mechanical imperfections, is coupled to amplifier limiter 26 which converts the sine wave to a square wave such that errors due to amplitude modulation are reduced. The amplifier limiter 26 can take a number of forms and can, for example, utilize conventional zero crossing techniques to produce the desired square wave output. Limiter 26 preferably produces a square wave output of approximately 5 volts zero-to-peak. The output of limiter 26 is connected to a second pulse shaper 28 (identical to pulse shaper 16) which is in turn connected to phase comparator 18. Pulse shapers 16 and 28 both convert the square wave inputs thereto into very narrow pulses as indicated by the waveforms $V_{FR}(t)$ and $V_{FE}(t)$, respectively, in FIG. 1 and FIGS. 2(a) and 2(b). Each of the pulse shapers 16, 28 preferably comprises a monostable multivibrator adjusted to provide an output pulse of approximately 0.6 micro second at the half voltage point.

Phase comparator 18 provides a digital error signal in the form of variable duty cycle rectangular waves, with each of the rising or leading edges thereof occurring at a $V_{FR}(t)$ pulse and each of the falling or trailing edges occurring at a $V_{FE}(t)$ pulse, thereby achieving pulses having a pulse width depending upon the relative phase of $V_{FR}(t)$ and $V_{FE}(t)$. System load disturbances will cause instantaneous angular position error or phase error between $V_{FR}(t)$ and $V_{FE}(t)$ which modulates the relative location of the trailing edges of the digital error signal, thereby effecting variation in the signal duty cycle or pulse widths.

Figure 3:
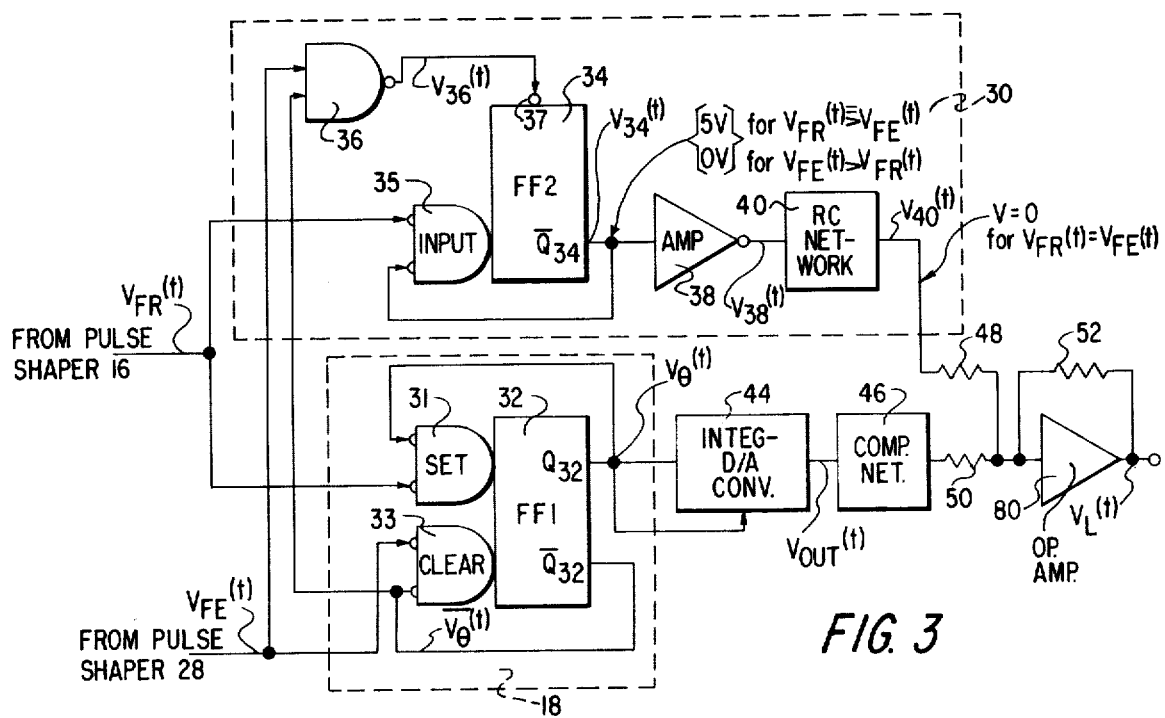
FIG. 3 is a schematic circuit diagram, partially in block form, showing the circuit details of the phase comparator and overspeed circuit of FIG. 1.

Referring to FIG. 3, there is shown a block diagram of a simple phase comparator, corresponding to comparator 18 together with an associated overspeed protection circuit 30, integrator-D/A converter unit 44, compensation network 46, and operational amplifier 80 (including input resistors 48 and 50 and feedback resistor 52), all these components also being shown in FIG. 1. As illustrated, comparator overspeed protection circuitry 18, 30 includes "set"—"clear" flip-flop 34, NAND gate 36, buffer amplifier inverter 38 and RC network 40, all interconnected as shown in FIG. 3. More particularly, the set input 31 of flip-flop 32 is connected to receive the $V_{FR}(t)$ output of pulse shaper 16 whereas the clear input 33 in connected to receive the $V_{FE}(t)$ output of pulse shaper 28. As illustrated, the $Q_{32}$ output of flip-flop 32 is connected back to the set input 31, and the $\overline{Q}_{32}$ output is similarly connected back to the clear input 33. The $Q_{32}$ output of flip-flop 32 is also connected to two inputs of integrator-D/A converter unit 44 which has its output applied via compensation network 46 to input resistor 50 of operational amplifier 80.

A typical unit for phase comparator 18, including flip-flop 32 and its set input 31 and clear input 33, is a Diode-Transistor Micrologic Pulse Triggered Binary Gated Flip-Flop (DT$\mu$L 950) supplied by Fairchild Camera and Instrument Corporation and operating as a R-S Flip-Flop or Counter Stage. The details of this flip-flop and its operation are disclosed in Fairchild data sheet SL-10 dated August 1965.

Respecting overspeed protection circuitry 30, the operation of which will be discussed in detail hereinafter, one input 35. of flip-flop 34 is connected to pulse shaper 16, and the corresponding output $\overline{Q}_{32}$ is connected back to input 35 as well as to input resistor 48 of operation amplifier 80 via amplifier inverter 38 and RC network 40. Another input to flip-flop 34 is direct input 37 which is connected to and receives the output of NAND gate 36, the inputs of which are from the $\overline{Q}_{32}$ output of flip-flop 32 and pulse shaper 28.

Figure 4:
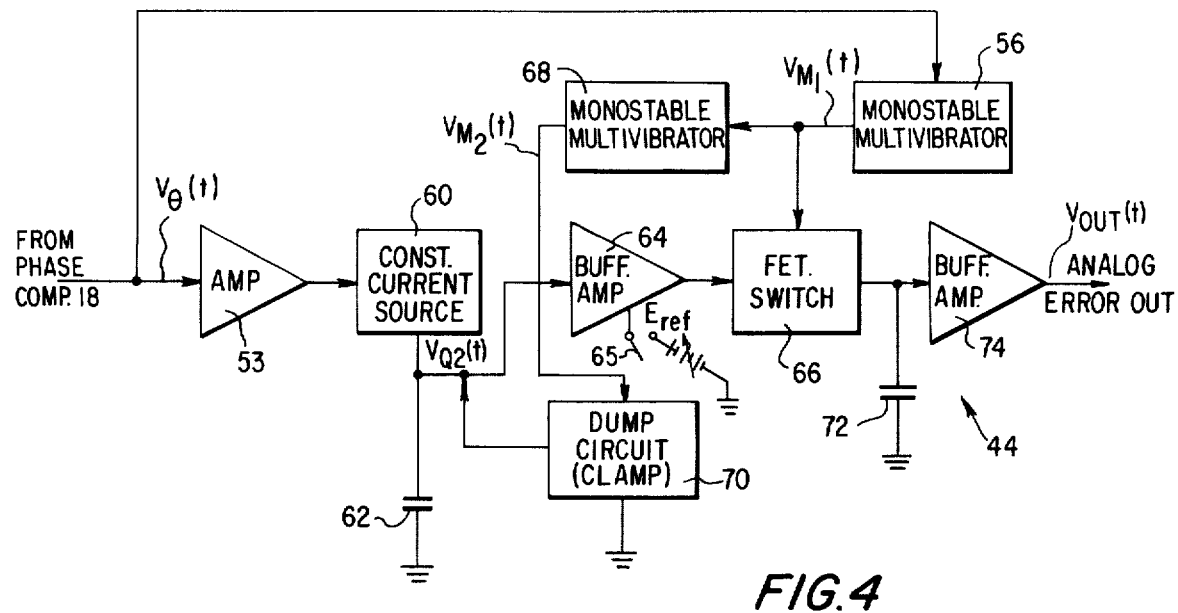
FIG. 4 is a schematic circuit diagram, largely in block form, of the integrator-digital-to-analog converter unit of FIG. 1.

The details of the makeup of integrator-D/A converter unit 44 are shown in FIG. 4. As illustrated, the integrator-D/A converter unit 44 includes an input amplifier 53 which receives the $Q_{32}$ output of phase comparator 18, this output also being connected to a first monostable multivibrator 56. The output of amplifier 53 is connected to a constant current source 60, the output of which is applied to one end of a first capacitor 62, the other end thereof being grounded. The signal developed across capacitor 62 is coupled to the input of buffer amplifier 64 which also has a variable reference voltage $E_{ref}$ connected thereto via switch 65. The output of buffer amplifier 64 is connected to an FET. switch 66 which receives a control input from monostable multivibrator 56. Monostable multibibrator 56 is also connected to a second monostable multivibrator 68, the output of which is connected to a dump circuit (clamp) 70 having a ground terminal and an input connected from capacitor 62. The output of FET. switch 66 is connected to ground through a second capacitor 72 and to a final buffer amplifier stage 74 which has, at its output, an analog error signal.

Monostable multivibrators 56 and 68 and buffer amplifiers 64 and 74 can be commercially available "micro" circuits. The remaining circuits are of conventional construction. Except for RC networks (not shown), which are used to set the pulse width durations of the monostable multivibrators 56 and 68, no differentiators and filters are required for the micro-circuit version.

The function of integrator-D/A converter unit 44 is to translate the pulse width information contained in the output of phase comparator 18 into a corresponding analog signal. The narrow input reference pulses $V_{FR}(t)$ and encoder pulses $V_{FE}(t)$, derived from pulse shapers 16 and 28 and shown in FIGS. 2(a) and (b), respectively, provide setting and clearing of flip-flop 32 of comparator 18, resulting therefrom in an output waveform $V_\theta$ (t), shown in FIG. 2(c), which is applied to both amplifier 53 of integrator-D/A converter unit 44 is amplified and thereafter applied to constant current source 60 which provides a signal for charging first capacitor 62 during the positive going portion of a pulse of the amplified $V_\theta$ (t) waveform, the charging of capacitor 62 terminating at the end of the positive portion of the duty cycle or trailing edge of the pulse of the amplified V (t) waveform. As illustrated in FIG. 2(f), $V_{Q2}(t)$ is the voltage waveform developed across capacitor 62. Thus, capacitor 62 serves as a square wave integrator for the total duration of the positive pulses (compare FIG. 2(c) and 2(f)). The integration operation performed by capcitor 62 is terminated at the trailing edge of each input pulse of waveform $V_\theta$ (t). The integrated signal, developed across capacitor 62, is coupled to FET. switch 66 via buffer amplifier 64 which has its bias set by reference voltage $E_{ref}$.

It will be noted that the D.C. bias of the digital-to-analog converter 44 can be set to vary about any desired D.C. level by varying the reference voltage $E_{ref}$ connected between buffer amplifier 64 and ground via switch 65. This feature is important in motor control applications because mechanical loads can often be separated into fixed and variable components. In addition, this control also permits the phaselock loop to operate at any selected percentage pulse-width.

At the same time as the integration operation is occurring, the trailing edge of the corresponding pulse of waveform $V_\theta$ (t), as applied to monostable multivibrator 56, is used to trigger monostable multivibrator 56. Multivibrator 56 produces an output pulse (see waveform $V_{M1}(t)$ of FIG. 2(d)) which "closes" FET. switch 66 for a time $t_a$, determined by the pulse width of the output pulse of multivibrator 56, and second capacitor 72 charges to a value corresponding to the amplitude of the pulse being applied thereto from FET. switch 66. Thus, any change in the pulse width of the input pulses of waveform $V_\theta$ (t) to integrator-D/A converter unit 44 is reflected by a corresponding change in the voltage level on capacitor 72 for each pulse cycle.

To prepare the integrator-D/A converter unit 44 for each succeeding input pulse of waveform $V_\theta$ (t), the output of multivibrator 56 is processed to produce a pulse having a leading edge which corresponds to the trailing edge of the output pulse of multivibrator 56. To this end, the output from multivibrator 56 (see waveform $V_{M1}(t)$ of FIG. 2(d)) is applied to multivibrator 68 whose output (see waveform $V_{M2}(t)$ of FIG. 2(e)) is coupled to dump circuit 70 which provides a low impedance path in parallel with capacitor 62 for the discharge thereof for a time $t_b$. Hence, with the aid of dump or clamp circuit 70 there is provided a means for discharging capacitor 62 so that it will be in the discharged condition when a succeeding pulse is applied thereto from constant current source 60, which succeeding pulse charges capacitor 62 as described above. Amplifiers 64 and 74 are connected as voltage followers and hence serve as buffer stages presenting high input impedances to the capacitor charing circuits of 62 and 72, respectively.

Figure 2:
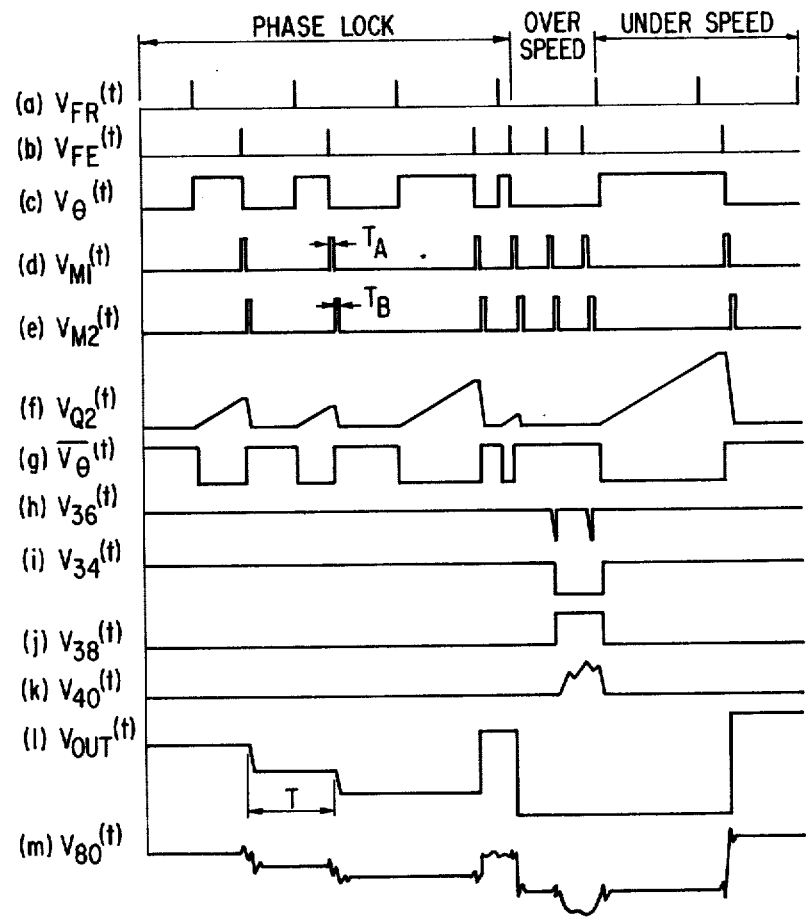
FIGS. 2(a) to 2(m) are voltage waveform diagrams for the voltages at various points in the system of FIG. 1 (and the circuits of FIG. 3 and 4)

The switching process described above is repeated within the period T (one half of this time being equal to the delay time of the integrator-D/A converter 44 unit), and the output is the staircase waveform $V_{out}(t)$ shown in FIG. 2($l$) when the input $V_\theta$ ($t$) waveform is phase modulated.

Since the control system described herein involves position detecting and is one which controls the instantaneous phase of a rotating torque motor, the system is inherently unstable. Accordingly, error rate damping is required along with integral compensation to reduce the steady state error. To this end, compensation network 46, connected to receive the analog error signal ($V_{out}(t)$ waveform of FIG. 2($l$)) from integrator-D/A converter unit 44, includes error rate damping and inetrgrating networks (not shown). While it is essentially a frequency sensitive circuit used to adjust the gain and phase of the error signal from integrator-D/A converter unit 44 to optimize system performance, it also includes an amplifier inverter stage 45 having a biasing means for establishing the zero level of a bi-directional error signal therefrom.

The output of compensation network 46 is connected to resistor 50 of operational amplifier 80, operational amplifer 80, as shown in FIG. 3, including suitable input resistors 48 and 50 and a feedback resistor 52. As will be discussed in more detail hereinafter, overspeed control circuit 30 is coupled to resistor 48 of operation amplifier 80 which functions to essentially combine the bi-directional error signal to essentially combine the bi-directional error signal with the output from overspeed circuit 30.

The compurator-over-speed circuit 18,30, along with integrator-D/A converter unit 44, compensation networks 46, and operational amplifier 80, enables the motor speed control system to perform three functional modes of operation, namely: (1) start and acceleration condition, (2) phaselock and (3) overspeed control and deceleration condition. Before proceeding further, the general details of these three functional modes of operation will be presented.

The first function mode, referred to as the start (underspeed) condition, is performed by flip-flop 32 and its associated control circuitry, integrator-D/A converter unit 44, compensation network 46, and operational amplifier 80 with its resistors 50 and 52. Initially, when power is applied to the motor speed control system, there is no output from high density encoder 20. Since reference frequency oscillator 10 is operational, a reference pulse stream $V_{FR}(t)$ is immediately applied from pulse shaper 16 to set input 31 of flip-flop 32 of phase comparator 18, thereby setting flip-flop 32, and therefore the $Q_{32}$ output thereof, to a "one" or more precisely in the example chosen to 5 volts zero-to-peak state. This output signal is furnished to integrator-D/A converter unit 44, where it is integrated until saturation is reached, and thereafter fed through the remaining circuitry of the phaselock loop, including the commutation network of brushless D.C. motor 22, as will be described in detail hereinafter, at a precise amplitude to the appropriate winding of motor 22.

Immediately, the rotor (not shown) of motor 22 starts rotating with increasing velocity, i.e., it acclerates. Since encoder 20 is coupled to the rotor by output shaft 92 of motor 22 (see FIG. 1), the pulse repetition rate of the pulses from encoder 20, and ultimately from pulse shaper 28, increases to approach that from pulse shaper 16, at which time, the motor 20 will be operating at its desired speed. More particularly, as the pulses from pulse shaper 28 increase in pulse repetition rate to approach that from pulse shaper 16, the acceleration of the motor tends to decrease and finally approaches zero (motor 22 at a constant average velocity) when the pulses from the two pulse shapers 16, 28 are at the same pulse repetition rate, this being due to the operation of flip-flop 32 in accordance with the clear and set inputs 33 and 31 thereof.

It is at this point that the system starts to operate in its phaselock mode. Flip-flop 32 is set by $V_{FR}(t)$ from pulse shaper 16 and cleared by $V_{FE}(t)$ from pulse shaper 28, pulse by pulse, establishing alternate wave of the same pulse repetition frequency as the reference pulses but of variable duty cycle in accordance with the pulses from pulse shaper 28. The duty cycle of this rectangular wave is proportional to the phase error, within a linear operating range of $\pm \pi$ radians with respect to the frequency of the reference signal where a 50 percent cycle (square wave) corresponds to zero phase error in the situation where the control system is so set to provide maximum control thereby. Accordingly, should motor 22 start to slow down, phase comparator 18 provides at its output a pulse type signal in which the duty cycle of the individual pulses, related to the motor speed, is utilized through circuitry, to be described in detail hereinafter, to bring motor 22 back to proper speed.

As long as the system is in mode 1 or 2, start and acceleration condition and phaselock condition, respectively, overspeed circuit 30 has no influence on the system. More particularly, by action of NAND gate 36 (see waveform output $V_{36}(t)$ in FIG. 2($h$)) and the feedback from $\overline{Q}_{34}$ to input 35 of flip-flop 34, the $\overline{Q}_{34}$ output of flip-flop 34 is maintained at 5 volts zero-to-peak (see waveform $V_{34}(t)$ in FIG. 2($i$)). This 5 volts is coupled to buffer amplifier inverter 38, which preforms the logic function of providing zero volts output (see waveform $V_{38}$ in FIG. 2($j$)) for a predetermined positive input voltage, which in this case is 5 volts. Accordingly, the output from overspeed circuit 30 (see waveform output $V_{40}(t)$ in FIG. 2($k$)) applied to resistor 48 of operational amplifier 80 is 0 volts and has no influence on the system.

The overspeed mode, utilizing overspeed circuit 30, comes into play only at such times as motor 22 exceeds its desired speed, for example, where two consecutive $V_{FE}(t)$ pulses occur without an intervening $V_{FR}(t)$ pulse. As shown in FIG. 3, NAND gate 36 and flip-flop 34 cooperate in detecting when the frequency of the signal from encoder 20 is greater than that provided by the signal from reference oscillator 10 (or frequency divider 12). More particularly, with motor 22 in this condition, NAND gate 36 has applied thereto (note overspeed portion of the waveform of FIG. 2) two positive signals of 5 volts zero-to-peak, one from pulse shaper 28 ($V_{FE}(t)$ waveform of FIG. 2($b$)) and the other from the $\overline{Q}_{32}$ output of flip-flop 32 ($\overline{V}_\theta$ (t) waveform of FIG. 2(g)). It therefore provides to input 37 of flip-flop 34 zero volts or a logical zero level for the pulse duration of its output (see waveform $V_{36}(t)$ in FIG. 2(h)). With zero volts at input 37, flip-flop 34 function such that $\overline{Q}_{34}$ is at zero volts or logical zero level (see waveform $\overline{V}_{34}(t)$ in FIG. 2(i)) regardless of what signal is applied to input 35. Buffer amplifier inverter 38 thereafter provides 5 volts zero-to-peak output for the period of time beginning with the occurrence of the second $V_{FE}(t)$ pulse and ending with the occurrence of a $V_{FR}(t)$ pulse, (see waveform $V_{38}(t)$ in FIG. 2(j)) which is in turn coupled to resistor 48 of operational amplifier 80 via RC network 40.

RC network 40, whose output voltage $V_{40}(t)$ takes the waveform shown in FIG. 2(k), prevents any noise signal from entering operational amplifier 80 from overspeed circuit 30 which could influence phaselock operation. In other words, RC network 40 only allows a signal to be coupled to operational amplifier 80 from overspeed circuit 30 when motor 22 is truly in overspeed condition (operational amplifier output $V_{80}(t)$).

Accordingly, by the operation just described, it is only when motor 22 exceeds its desired speed that a positive signal is applied to resistor 48 of operational amplifier 80 from overspeed circuit 30 which in turn substracts from the signal at resistor 50 of operational amplifier 80, thereby causing a negative acceleration (deceleration) of motor 22.

The function of the first and third operational mode just discussed might be said to be of the so-called "bangbang" type, each operational mode being unstable in nature until motor 22 reaches its synchronous speed. When the motor 22 reaches the phaselock condition, synchronous speed, and the system is functioning in its second operational mode, the output of flip-flop 32 is a rectangular wave whose duty cycle is a function of the relative phase of the inputs from pulse shapers 16 and 28.

Figure 5:
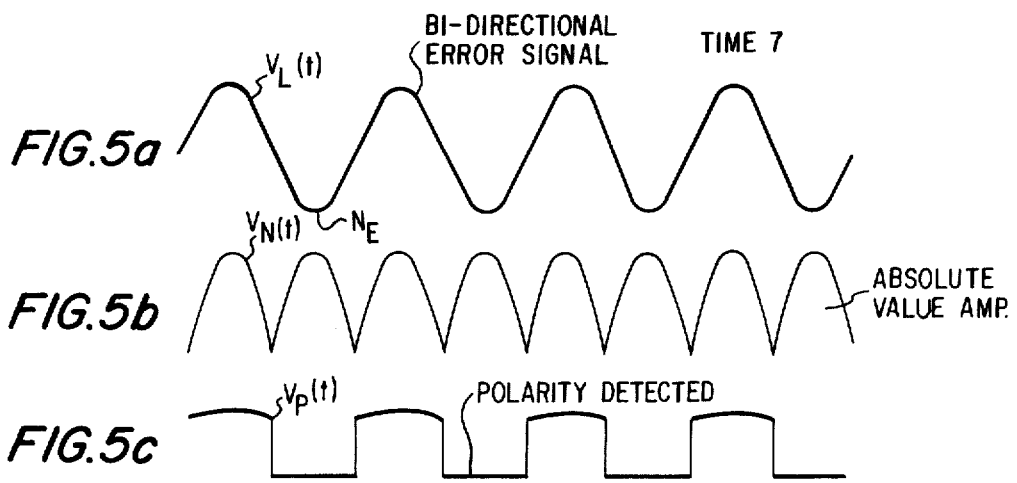
FIG. 5(a) to 5(c) are voltage waveform diagrams used in explaining the operation of bi-directional control of FIG. 1.

Referring again to FIG. 1, the bi-directional control feature of the invention will now be considered with the system operating in the phase lock mode. Operational amplifier 80 is connected to an absolute value amplifier (AVA) 82, which is arranged and designed to accept, amplify, and rectify, e.g., a bi-directional error input signal $V_L(t)$ (shown in FIG. 5(a)) from operational amplifier 80. The bi-directional error input, while shown as a smooth curve in FIG. 5(a), is in fact composed of waveform $V_{80}(t)$ of FIG. 2(m), waveform $V_{80}(t)$, as shown, being only a small portion of waveform $V_L(t)$ at the peak negative excursion $N_E$ thereof. AVA 82 receives this bi-directional error input $V_L(t)$ and developes corresponding outputs--rectified error signals, $V_N(t)$ and polarity detection signal, $V_P(t)$, (see FIGS. 5(b) and 5(c), respectively), the later signal being developed with the cooperation of rotation decoder 84 at the output thereof, the input thereto being from AVA 82. Rotational decoder 84 also controls clockwise (CW) and counterclockwise (CCW) operation of motor 22, as commanded. Commands for the selection of the motors' operating direction are effected through CW and CCW control inputs, indicated by arrows 84A and 84B, being applied to rotation decoder 84, as for example, transistor transistor logic, TTL, level signals.

Rotation decoder 84 is connected to a pair of position decoders 86 to which it applies polarity detection signal, $V_P(t)$, of FIG. 5(C). Also connected to the position decoders 86 are respective ones of position sensors 88 which produce signals related to the position of the permanent magnet rotor (not shown) of motor 22.

The rectified error signals, $V_N(t)$ of FIG. 5b, from AVA 82 are applied to two identical power amplifier-commutators 42, each including an operational amplifier 42A, to which a respective rectified error signal, $V_N(t)$, from AVA 82 is applied, and electronic power commutator 42B, to which the output signal from its associated position decoder 86 is applied. The output signal from amplifier 42A is coupled to power commutator 42B. To minimize lags occurring in the phaselock control operational mode, current feedback is provided, in each case, from the output of power commutator 42B to the input of amplifier 42A, in such a way that the electrical time constant of motor 22 does not influence open loop response at crossover. Power commutators 42B, under the control of position decoders 86 and with the aid of suitable logic gates (not shown), use the outputs of rotar position sensors 88 to switch the stator windings 22A, 22B via switches 90 so as to apply to the stator winding 22A, 22B, at the proper time, the output signals from power commutators 42B to provide commutation and therefor continuous rotation of the rotor of motor 22.

Each of the power amplifier-commutators 42, just discussed, is fundamentally a straight-forward amplifier which operates, as previously described, in conjunction with respective ones of position sensors 88, respective position decoder 86, and rotational decoder 84. However, power amplifier-commutators 42 utilizes two features which make them unique. The first is the provision of current feedback which effectively makes the operational amplifiers 42A current sources, thereby moving the electrical time constant to a very high frequency which is well beyond the control loop frequency making the control essentially insensitive to motor back E.M.F.. The other feature is the bidirectional capability provided.

Motor 22 is shown as a double delta brushless D.C. motor which comprises a permanent magnet rotor (not shown) and two wound stator windings 22A and 22B separated by 30 electrical degress, each comprising three non-rotating windings connected in a delta configuration. Stator windings 22A, 22B are interconnected via respective one of two sets of six solid state switches 90—namely, switches 90A, 90B, 90C, 90D, 90E and 90F for winding 22A and switched 90G, 90H, 90I, 90J, 90K and 90L for winding 22B—with respective power commutators 42B. They are energized, as previously mentioned, in accordance with signals from the respective power commutators 42B being applied thereto via cooperating switches 90 under the control of respective position decoders 86. Hence, motor 22 is comparable to a brush D.C. motor with twelve commutators bars per electrical cycle.

While not shown, motor 22 is provided with a slotted disc which interrupts, in sequence, six light beams (not shown) associated with position sensors 88. Moreover, although, in the embodiment under consideration, the rotor position is sensed optically by light emitters and phototransistors, other techniques such as Hall effect devices, magneto-resistors and even auxiliary stator windings can also be used. Since brushless motors and their associated commutation circuits responsive to such sensors are well known, a detailed description thereof will be omitted. It is important to note here that the commutation circuits for brushless D.C. motor 22 form an integral part of the phaselock loop, particularly in their novel inconnections and cooperation, as described hereinabove, with rotational decoder 84 and power amplifier-commutators 42.

The use of two delta stator windings 22A, 22B separated by 30 electrical degrees and connected in parallel overcomes the low speed operational limitations of motor 22 by reducing the torque ripple often found in D.C. brushless motors. Each delta winding 22A, 22B of motor 22 commutates within a 60 electrical degree zone, generally resulting in relative torque sensitivity and back E.M.F. variations from 0.866 to unity. However, because each delta winding is separated by 30 electrical degrees, the actual relative torque and back E.M.F. variations cancel and vary only from 0.94 to unity. Further, the double delta motor winding scheme has inherent reliability in that there is no single point failure (short or open) in one delta winding's drive that prevents phaselock operation with the other delta winding.

It should be noted that the requirement for bi-directional torques is not to enable motor 22 to be commanded in CW and CCW directions since this can be done merely by reversing the motor commutation sequence, but rather so that either positive or negative torque disturbances are kept under symmetrical servo control, e.g., the motor can also be controlled in those tape recorder systems wherein the tape itself, in some instances, drives the motor. This consideration includes both long term and instantaneous loads.

Referring again to FIG. 1, the rotor of motor 22 is provided with output shaft 92 which serves to drive tape head load 24 or other conventional mechanical loads which require precision drives. Output shaft 92 is also connected to encoder 20 and to the slotted disc (not shown), mentioned above as cooperating with position sensors 88.

Although the invention has been described with respect to an exemplary embodiment thereof, it will be understood that variations and modifications can be effected in this exemplary embodiment without departing from the scope and spirit of the invention. For example, while in the exemplary embodiment position sensors 88 and high density encoder 20 are illustrated as being two independent units connected to output shaft 92, they can of course be combined in a single unit.

What is claimed is:

1. In combination, a brushless D.C. motor and motor speed control system for controlling the speed of said motor, said system comprising:
    means for generating a reference frequency signal;
    sensor means responsive to the motor for producing angular position signals and including an output signal having a frequency in accordance with the speed of the motor;
    phase comparator means for comparing the reference frequency signal with the sensor output signal and for producing an output pulse train in which each pulse thereof is determined in accordance with the difference in frequency and phase between the reference frequency signal and the sensor output signal;
    integrator-digital-to-analog converter means for converting the output of said phase comparator into an analog error signal voltage,
    biasing means for converting said analog error signal voltage to a bi-directional error signal voltages; and
    means responsive to the bi-directional error signal voltage of said biasing means for controlling acceleration or deceleration of said motor to achieve symmetrical bi-directional torque control thereof.

2. A combination as claimed in claim 1, wherein the last mentioned means includes an absolute value amplifier coupled to receive said bi-directional error signal voltage for producing an pair of amplitude control signals; and rotational decoder means connected to said absolute value amplifier for cooperating therewith to produce a polarity control signal.

3. A combination as claimed in claim 2, wherein the said last mentioned means further comprises position decoder means, connected to receive said angular position signals from said sensor means and said polarity control signal from said rotational decoder means, for producing an electrical signal in accordance with the position of the output shaft; a pair of amplifier means connected to receive respective ones of the pair of amplitude control signals of said absolute value amplifier and the output of said position decoder means; and switching means responsive to the output of said amplifier means for controlling the sequence and level of current flow through the motor windings.

4. A combination as claimed in claim 3, wherein said pair of amplifier means each comprise an operational amplifier having a first input connected to a respective one of the amplitude control signals of said absolute value amplifier; power commutator means connected to the output of said operational amplifier and to the output of said position decoder means; and a current feedback loop connected between said power commutator means and a second input to said operational amplifier.

5. A combination as claimed in claim 4, wherein said position decoder means includes a pair of position decoders, each having a first input connected to receive a respective angular position signal from said sensor means and a second input connected to receive the polarity control signal from said rotation decoder means, the outputs thereof being coupled to the power commutator of respective ones of said pair of amplifier means.

6. A combination as claimed in claim 1, further comprising overspeed control means resposive to the output signal of said sensor means and said reference frequency signal and having an output combined with said bi-direction error signal for preventing the speed of said motor from exceeding a predetermined value.

7. A combination as claimed in claim 1, wherein said sensor means includes position sensor means for sensing the absolute position of the output shaft of said motor for motor commutation purposes and encoder means for producing said output signal having a frequency in accordance with the speed of said motor.

* * * * *